United States Patent
Möller et al.

(10) Patent No.: US 7,263,842 B2
(45) Date of Patent: Sep. 4, 2007

(54) METHOD AND DEVICE FOR COOLING A MASS OF A SUBSTANCE

(75) Inventors: Kirsten Möller, Bad Lippspringe (DE); Robert Taylor, Wavre (BE); Johannes Beuse, Düsseldorf (DE)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 291 days.

(21) Appl. No.: 10/491,656

(22) PCT Filed: Sep. 26, 2002

(86) PCT No.: PCT/EP02/11352

§ 371 (c)(1),
(2), (4) Date: Apr. 2, 2004

(87) PCT Pub. No.: WO03/030663

PCT Pub. Date: Apr. 17, 2003

(65) Prior Publication Data

US 2004/0255599 A1  Dec. 23, 2004

(30) Foreign Application Priority Data

Oct. 2, 2001 (DE) ................. 101 48 777

(51) Int. Cl.
*F25D 17/02* (2006.01)
*F25D 3/12* (2006.01)

(52) U.S. Cl. ................... 62/64; 62/384

(58) Field of Classification Search ............ 62/64, 62/382, 384, 342, 373, 52.1, 3.3, 3.6
See application file for complete search history.

(56) References Cited

U.S. PATENT DOCUMENTS 5,309,722 A * 5/1994 Phillips, Jr. ............. 62/64
6,026,648 A * 2/2000 Cloarec et al. .......... 62/64
6,233,950 B1   5/2001 Cloarec

FOREIGN PATENT DOCUMENTS

DE       33 44 521      6/1985

(Continued)

OTHER PUBLICATIONS

International Search Report for PCT/EP02/11352.

*Primary Examiner*—Marc Norman
(74) *Attorney, Agent, or Firm*—Christopher J. Cronin; Elwood Haynes

(57) ABSTRACT

A method and a device for cooling a mass of meat-, tissue-, vegetable- and/or fruit-containing substance in a container, in particular a mixer, blender or mill, using liquefied nitrogen ($N_2$) which is supplied in the lower region of the container at a constant working pressure via at least one nozzle. During the cooling process and/or in stoppage times, the nitrogen is briefly supplied to the nozzle or, via the latter, into the container by means of at least one pressure pulse that is increased in relation to the working pressure. The pulsed supply of pressurized nitrogen blows blocked and/or iced-up nozzles free again and thus ensures a more reliable operation of cooling a mass of a substance. This method and device are suitable, in particular, for use in foodstuff technology.

31 Claims, 2 Drawing Sheets

FOREIGN PATENT DOCUMENTS

| | | |
|---|---|---|
| DE | 33 47 937 | 10/1985 |
| EP | 0 711 511 | 5/1996 |
| EP | 711511 A2 * | 5/1996 |
| EP | 0 978 697 | 2/2000 |
| WO | WO98 57196 | 12/1998 |

* cited by examiner

METHOD AND DEVICE FOR COOLING A MASS OF A SUBSTANCE

BACKGROUND OF THE INVENTION

1. Field of the Invention

The present invention relates to a method and a device for cooling a mass of a, for example, meat-, tissue-, vegetable- and/or fruit-containing substance in a container, in particular a mixer, blender or mill, using liquefied nitrogen ($N_2$) which is supplied in the lower region of the container at a constant working pressure via at least one nozzle.

2. Related Art

Generic methods and devices are known, for example, from EP 0 978 697 A1 or WO 98/57196 which likewise deal with the known problem that sometimes tough foodstuffs, such as meat-, tissue-, vegetable-, and/or fruit-containing products, often cause clogging in devices, such as mixers, blenders or mills, and are difficult to process any further. In this respect, it is known to make the mass brittle, for example by cooling with liquid nitrogen, so that clogging is reduced and further processing, for example into hamburgers, chicken nuggets, vegetable burgers, fruit pouches or the like, becomes easier.

The mass is preferably cooled with liquid nitrogen by uniform penetration. For this purpose, rotating blade elements are arranged in the container, which mix, blend, knead and/or grind the mass of a substance. Liquefied nitrogen is simultaneously supplied in the lower region of the container at a constant working pressure via at least one nozzle. Depending on the substance to be mixed, after about 2 to 60 minutes the mass acquires a consistency which allows easier further processing.

However, cooling processes of this kind have not always proceeded reliably in the past. Thus, it was to be observed that the nozzles projecting in the lower region of the container repeatedly become blocked and/or iced up individually. As a result of the impaired supply of liquid nitrogen, the duration of the cooling process became up to 50% longer in a disadvantageous way. Moreover, the nozzles had to undergo cleaning, and this was possible usually only in stoppage times and after a sometimes complicated conversion of the plant.

The object of the present invention is to specify a method and a device which ensure reliable operation for cooling a mass of a substance. In particular, simple cleaning of nozzles, even within the duration of a cooling process, is to become possible.

SUMMARY OF THE INVENTION

This object is achieved by means of a method and a device for cooling a mass such as, a meat-, tissue-, vegetable-, and/or fruit-containing substance. The substance is placed in a container, such as a mixer. blender, or mill, and liquefied nitrogen or any other cryogenic liquidified inert gas is supplied to the lower region of the container as the refrigerant. The nitrogen is supplied at a constant working pressure via at least one nozzle, wherein, during the cooling process and/or in stoppage times, the nitrogen is briefly supplied to the nozzle by means of at least one pressure pulse which is increased in relation to the working pressure.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
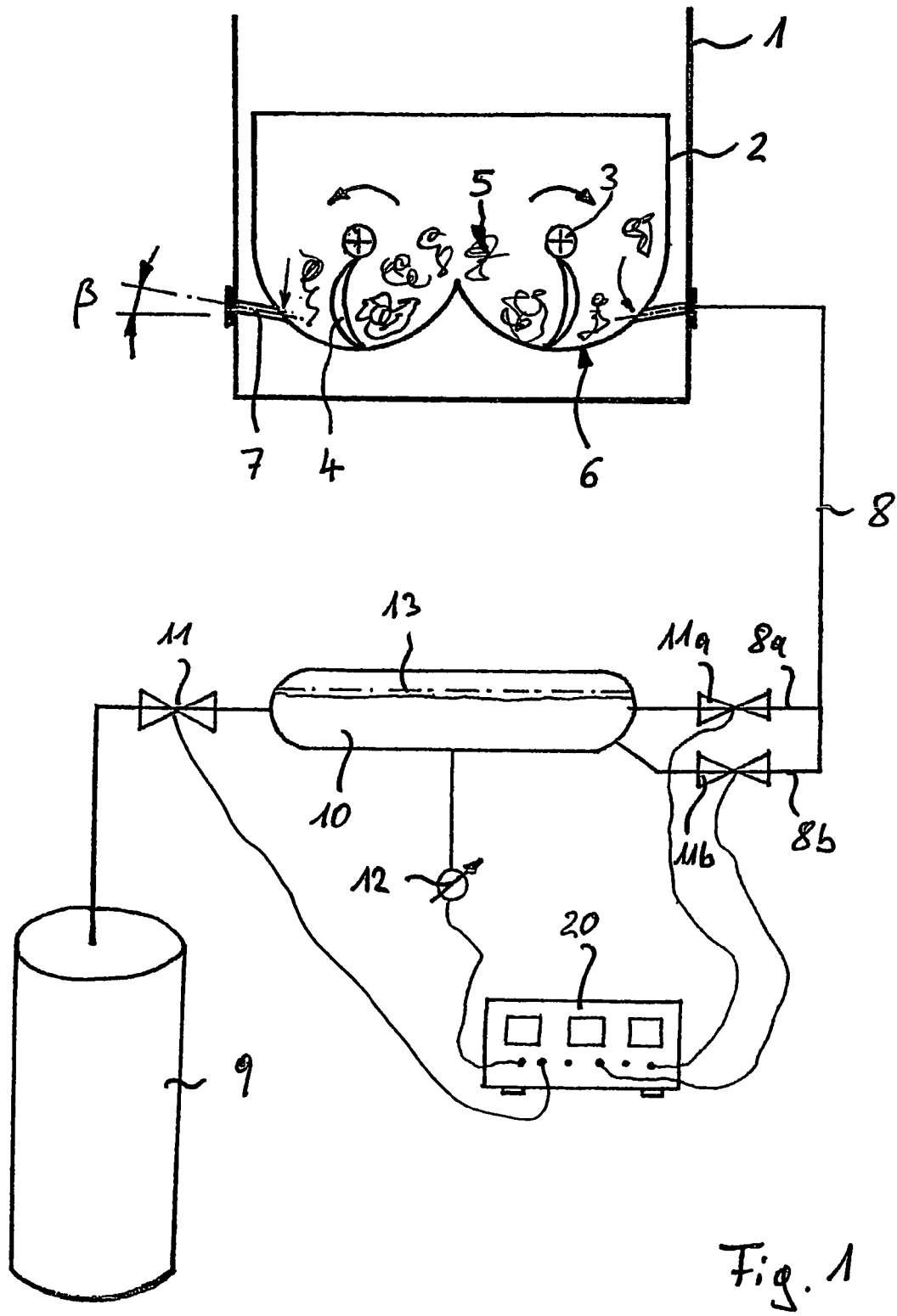
FIG. 1 shows a device according to the invention.

The method according to the invention for cooling a mass of a, for example, meat-, tissue-, vegetable- and/or fruit-containing substance in a container, in particular a mixer, blender or mill, using liquefied nitrogen ($N_2$) which is supplied in the lower region of the container at a constant working pressure via at least one nozzle, is distinguished in that, during the cooling process and/or in stoppage times, the nitrogen is briefly supplied to the nozzle or, via the latter, into the container by means of at least one pressure pulse which is increased in relation to the working pressure. The pulsed supply of pressurized nitrogen blows blocked and/or iced-up nozzles free again and thus advantageously ensures a more reliable operation of cooling a mass of a substance.

At working pressures of, for example, between 1.5 and 3.5 bar, preferably between 2 and 3 bar, in particular 2.5 bar, according to the invention the individual pressure pulse is preferably more than 4 times the working pressure in the case of, for example, slightly tough masses, preferably more than 6 times the working pressure in the case of, for example, partly stuck-up and partly iced-up nozzles and, in particular, more than 8 times the working pressure in the case of, for example, severe icing-up of the nozzle, that is to say about 16 to 22 bar, preferably about 18 to 20 bar, in particular about 19 bar.

Operating reliability can be further increased if pressure pulses are not generated solely when blockage or icing-up has occurred, but also at regular time intervals, preferably every 4 to 6 minutes, in particular every 5 minutes. This sometimes advantageously avoids the need for means for observing and readjusting the process and advantageously makes it possible to resort to experimental values or makes manual regulation of the process necessary at most towards its end.

Preferably, according to the invention, the pressure pulses are generated as follows:

- liquid nitrogen which is under working pressure is enclosed hermetically in a storage region to which heat energy can be supplied;
- as a result of the absorption of heat energy, part of the liquid nitrogen evaporates;
- by virtue of different volumes of gaseous and liquid nitrogen, the pressure in the closed storage region rises;
- when a desired set pressure value is reached, liquid nitrogen alone or a mixture of liquid and gaseous nitrogen is released in a pulsed manner.

The use of nitrogen as a working and pressure fluid advantageously makes it possible to construct and maintain generic plants less expensively, as compared with plants comprising special cleaning devices and/or process management means.

The device according to the invention, in particular for carrying out the above-described method, for cooling a mass of a, for example, meat-, tissue-, vegetable- and/or fruit-containing substance in a container, in particular a mixer, blender or mill, using liquefied nitrogen ($N_2$) which can be supplied in the lower region of the container at a constant working pressure via at least one nozzle, is advantageously distinguished by means for generating at least one pressure pulse which is increased in relation to the working pressure and by means of which liquid and/or gaseous nitrogen can be supplied to the nozzle or, via the latter, into the container during the cooling process and/or in stoppage times.

Preferably, according to the invention, the device comprises a hermetically lockable storage region, in which liquid nitrogen can partially evaporate by the supply of heat energy, so that, by virtue of different volumes of gaseous and liquid nitrogen, the pressure in the closed storage region rises until a desired set pressure value is reached and liquid nitrogen alone or a mixture of liquid and gaseous nitrogen can be released in a pulsed manner.

The storage region may be arranged essentially vertically or horizontally and be installed in series or in parallel in a supply system. A horizontally arranged storage region which is part of a supply line preceding the nozzle is preferred. Such a storage region advantageously allows a controlled pressure build-up by the separation of liquid and gaseous nitrogen into two regions, if appropriate by means of a diaphragm, and the release of liquid nitrogen alone or of a mixture of liquid and gaseous nitrogen, that is to say the highest possible variance of pressure pulses.

Preferably, according to the invention, the nozzle contains polytetrafluoroethylene (PTEF) which is advantageously suitable for use in foodstuff technology, in particular owing to low adhesive forces, a low heat capacity and conductivity and, in general, its inert characteristic.

For the further avoidance of sticking and icing-up, a nozzle is proposed, which has on the fluid-outlet side a conical aperture angle α of between 4° and 12°, preferably of between 6° and 10°, in particular of 8°, and which advantageously makes it easier to carry out any blowing-out which is necessary.

Alternatively or additionally to this, a nozzle with a surface which is located on the fluid-outlet side is proposed, which is designed to match with an imaginary spatial surface which is formed by a rotatable or revolving mixing element arranged in the container of the device, the distance of the spatial surface formed by the mixing blades from that surface of the nozzle which is located on the fluid-outlet side being less than 5 mm, preferably less than 3 mm, in particular less than 1 mm, as a result of which, advantageously, slight deposits of mass, in particular in the flow duct of the nozzle, or incipient icing-up are from time to time stripped away mechanically.

For the further avoidance of blocked nozzles, it is proposed that the nozzle project into the container at an angle of inclination β of between 4° and 12°, preferably of between 6° and 10°, in particular of less than 8°.

The device preferably comprises, furthermore, means for regulating the continuous and/or pulsed introduction of nitrogen into the container both via individual nozzles and groups of nozzles or all the nozzles projecting into the container.

The present invention is suitable, in particular, for use in foodstuff technology.

FIG. 1 shows, by way of example, a device according to the invention. A housing 1 comprises a container 2, in which, for example, two shafts 3 rotating in opposite directions during the cooling process are mounted. The centre points of the shafts 3 are marked by crosses and the respective direction of rotation by arrows. Arranged on the shafts 3 are mixing elements or mixing blades 4 which mix, blend, knead or grind a tough mass 5 of a, for example, meat-, tissue-, vegetable- and/or fruit-containing substance 5. The lower region of the container 2 is preferably designed as a double trough 6, that is to say so as to correspond to an imaginary spatial surface formed by the mixing elements 4 revolving in the container 2. Between the housing 1 and the container 2 are arranged in each of the two sides at least one nozzle 7, preferably two nozzles, and, depending on the longitudinal extent of the device, in particular at least three or four nozzles.

The nozzles 7 preferably project at an angle of inclination β into the trough region 6 of the container 2. A supply line 8 connects the nozzles 7 to a reservoir 9 for liquefied nitrogen ($N_2$) which, in this state of aggregation, has a temperature lower than −196° C. and can be obtained industrially in a very simple way, even in relatively large quantities, for example by air separation, that is to say by the fractionation of liquid air. The liquefied nitrogen is supplied to the mass of a substance 5 at a constant working pressure via the nozzles 7. The liquid nitrogen advantageously brings about a very rapid thermodynamic exchange, in particular on the surface of the mass 5, which quickly becomes more brittle, so that clogging can be avoided and subsequent further processing of the mass becomes easier.

The supply system 8 comprises a preferably horizontally arranged storage region 10 which can be locked hermetically by means of at least one respectively preceding and following valve 11, 11a, 11b. The heat insulation of the storage region 10 does not have to satisfy stringent requirements. On the contrary, it is possible for the liquefied nitrogen to evaporate partially in the storage region 10 by the supply of heat energy, so that, by virtue of the different volumes of liquid and gaseous media, the pressure in the closed storage region 10 rises until a desired set pressure value is reached, the latter being detected and/or indicated by a pressure device 12. Liquid and gaseous nitrogen can be separated in the storage region 10 by means of a diaphragm 13, in particular for safety reasons. The storage region 10 may have a plurality of outlet points, so that variable pressure pulses can also be released: thus, the nozzles 7 can be supplied, in a pressure pulse lying above the working pressure, with a mixture of liquid and gaseous nitrogen via a supply portion 8a and, for example, with liquid nitrogen alone via a supply portion 8b.

The pressure device 12 and the valve 11 preceding the storage region 10 or the valves 11a, 11b following the said storage region are preferably connected to a regulating unit 20 which controls the continuous and/or pulsed introduction of nitrogen into the container 2 via individual nozzles 7, groups of nozzles 7 and/or all the nozzles 7. In particular, the regulating unit 20 makes it possible to close the valves 11, 11a, 11b and consequently hermetically enclose a defined quantity of liquefied nitrogen in the storage region 10 and also release it after build-up and the determination of a set pressure value via the pressure device 12.

Figure 2:
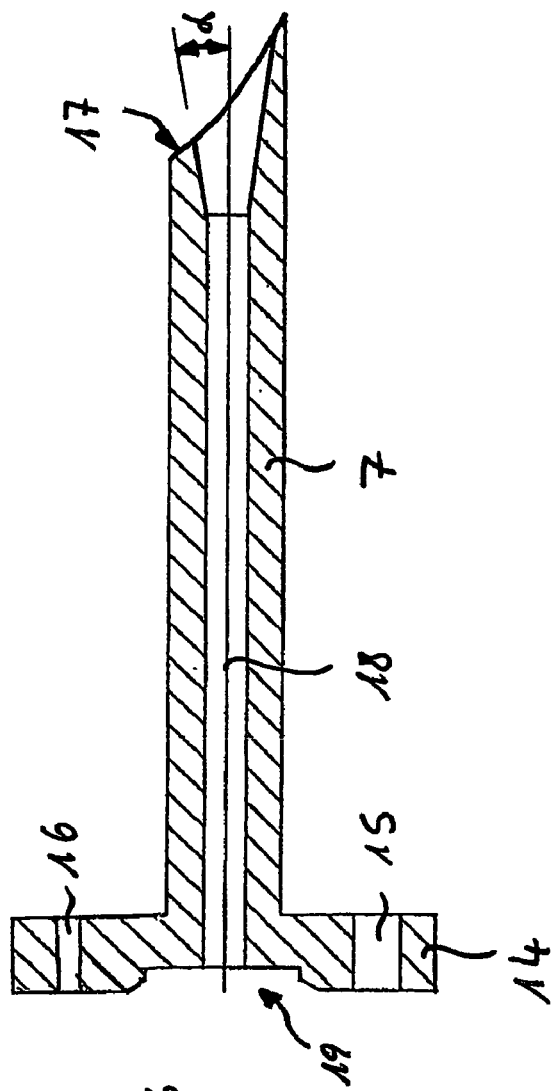
FIG. 2 shows a sectional front view of the nozzle.

FIG. 2 shows a sectional front view of a nozzle 7 installed preferably in a device, as described above, for cooling a mass of a substance. It can be seen clearly that the nozzle 7 has on the fluid-outlet side (illustrated on the right in FIG. 2) a conical aperture angle α which advantageously also makes it easier to carry out a necessary blowing-out of deposits and/or icing-up in the flow duct 18 of the nozzle 7. For reasons of fluid mechanics, the inlet region 19 of the nozzle 7 (on the left in FIG. 2) may also have a conical region α (not illustrated) which widens towards the base 14 of the nozzle 7. The base 14 also advantageously has, in addition to passage bores 15 for fastening the nozzles 7 to the housing 1, a retention aid 16, for example likewise a passage bore 16, for the fault-free installation of the nozzle 7 on the device.

Alternatively or additionally to a conical aperture angle α, the nozzle 7 may have a specially configured surface 17 which is located on the fluid-outlet side and which is designed to match with the above-described spatial surface or contour of the trough 6.

Figure 3:
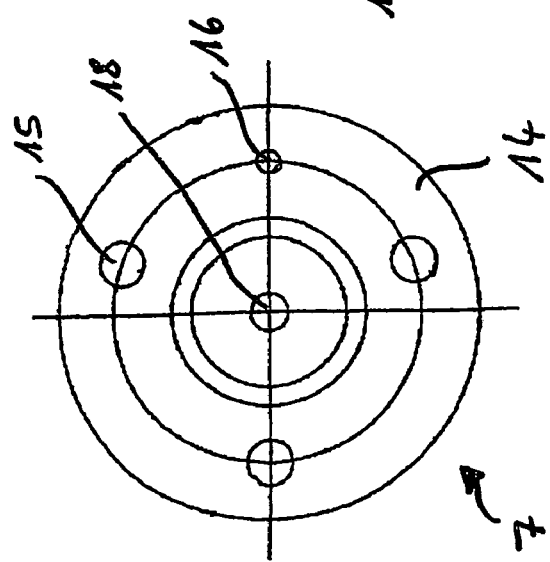
FIG. 3 shows a side view from the left of the nozzle according to FIG. 2.

Finally, FIG. 3 shows a side view from the left of the nozzle 7 according to FIG. 2 or of its base 14.

The nozzle 7 preferably contains polytetrafluoroethylene (PTEF) which is advantageously suitable for use in foodstuff technology, in the same way as the invention as a whole, in particular owing to low adhesive forces, a low heat capacity and conductivity and, in general, its inert characteristic.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

| List of reference symbols | |
|---|---|
| 1 | Housing |
| 2 | Container |
| 3 | Shafts |
| 4 | Mixing elements or mixing blades |
| 5 | Mass of a substance |
| 6 | Trough or double trough |
| 7 | Nozzle |
| 8, 8a, 8b | Supply line |
| 9 | Nitrogen reservoir |
| 10 | Storage region |
| 11, 11a, 11b | Valve |
| 12 | Pressure device |
| 13 | Diaphragm |
| 14 | Base |
| 15 | Passage bore |
| 16 | Retention aid |
| 17 | Surface, located on the fluid-outlet side, of the nozzle 7 |
| 18 | Flow duct |
| 19 | Inlet region |
| 20 | Regulating unit |

The invention claimed is:

1. A method of cooling, comprising:
a) providing a food substance to be cooled in a container, the food substance comprising at least one member selected from the group consisting of:
  i) meat;
  ii) tissue;
  iii) vegetable; and
  iv) fruit,
  said container comprising at least one of a mixer, a blender, and a mill to process the food substance disposed in a lower region of the container during a cooling process, said container further comprising at least one nozzle disposed in the lower region;
b) introducing liquefied nitrogen into said lower region at a constant working pressure via said nozzle; and
c) supplying said liquefied nitrogen, via said nozzle, by means of at least one pressure pulse during at least one of the cooling process stoppage times, wherein said pulse comprises an increased pressure in relation to said working pressure.

2. The method according to claim 1, wherein said pressure pulse is more than 4 times the working pressure.

3. The method according to claim 2, wherein said pressure pulse is more than 6 times the working pressure.

4. The method according to claim 3, wherein said pressure pulse is more than 8 times the working pressure.

5. The method according to claim 1, wherein said working pressure is between 1.5 and 3.5 bar.

6. The method according to claim 5, wherein said working pressure is between 2 and 3 bar.

7. The method according to claim 6, wherein said working pressure is 2.5 bar.

8. The method according to claim 1, wherein said pressure pulse is between 16 and 22 bar.

9. The method according to claim 8, wherein said pressure pulse is between 18 and 20 bar.

10. The method according to claim 9, wherein said pressure pulse is 19 bar.

11. The method according to claim 1, wherein said pressure pulses are generated at regular time intervals.

12. The method according to claim 11, wherein said pressure pulses are generated every 4 to 6 minutes.

13. The method according to claim 12, wherein said pressure pulses are generated every 5 minutes.

14. The method according to claim 1, wherein said at least one pressure pulse is generated as follows:
a) hermetically enclosing liquid nitrogen under working pressure in a storage region, wherein said storage region comprises a heat transfer means;
b) transferring heat via said heat transfer means, thereby evaporating part of said liquid nitrogen;
c) increasing the pressure of said storage region, by virtue of different volumes of gaseous nitrogen and liquid nitrogen; and
d) releasing in a pulsed manner liquid nitrogen or a mixture of liquid and gaseous nitrogen, when a desired set pressure value is reached.

15. An apparatus for cooling a food substance comprising:
a) a container comprising a lower region and at least one nozzle disposed in the lower region;
b) said container comprising at least one of a mixer, a blender and a mill to process the food substance disposed in the lower region of the container during a cooling process;
c) said nozzle comprising a fluid-outlet side;
d) a liquid nitrogen source fluidly connected to said nozzle, said liquid nitrogen source comprising a means for providing constant pressure; and
e) means for providing, via said nozzle, at least one pressure pulse in said liquid nitrogen during at least one of the cooling process and stoppage times, wherein said pulse comprises an increased pressure in relation to said working pressure.

16. The apparatus according to claim 15, further comprising a hermetically lockable storage region containing liquid nitrogen.

17. The apparatus according to claim 16, wherein said storage region is part of a supply line attached to said nozzle.

18. The apparatus according to claim 15, wherein said nozzle is comprised of polytetrafluoroethylene (PTEF).

19. The apparatus according to claim 15, wherein said fluid-outlet side comprises a conical aperture angle α of between 4° and 12° relative to the centerline of said nozzle.

20. The apparatus according to claim 19, wherein said conical aperture angle α is between 6° and 10° relative to the centerline of said nozzle.

21. The apparatus according to claim 20, wherein said conical aperture angle α is about 80 relative to the centerline of said nozzle.

22. The apparatus according to claim 15, further comprising at least one mixing element rotatable in said container, said nozzle comprising a surface located on the fluid-outlet side which is designed to match with a spatial surface formed by said mixing element revolving in said container.

23. The apparatus according to claim 15, wherein a first gap is formed between said spatial surface formed by said rotating mixing elements and said surface of said nozzle, wherein said first gap is less than 5 mm.

24. The apparatus according to claim 23, wherein said first gap is less than 3 mm.

25. The apparatus according to claim 24, wherein said first gap is less than 1 mm.

26. The apparatus according to claim 23, wherein said nozzle projects into said container at an angle of inclination β of between 4° and 12° relative to a horizontal reference line.

27. The apparatus according to claim 26, wherein said angle of inclination β is between about 6° and about 10° relative to a horizontal reference line.

28. The apparatus according to claim 27, wherein said angle of inclination β is less than 8° relative to a horizontal reference line.

29. The apparatus according to claim 15, wherein said means for providing said pressure pulse comprises individual nozzles, groups of nozzles, or all said nozzles.

30. An apparatus according to claim 15, wherein said mass comprises at least one member selected from the group consisting of meat, tissue, vegetable, and fruit.

31. A method of cooling, comprising:
a) providing a food substance to be cooled in a container, said food substance comprising at least one member selected from the group consisting of meat, tissue, vegetable, and fruit, said container comprising at least one of a mixer, a blender, and a mill to process the food substance disposed in a lower region of the container during a cooling process, said container further comprising at least one nozzle disposed in the lower region;
b) introducing liquefied nitrogen into said lower region at a constant working pressure via said nozzle; and
c) supplying said nitrogen, via said nozzle, by means of at least one pressure pulse during at least one of the cooling process and stoppage times, wherein said pulse comprises an increased pressure in relation to said working pressure, wherein said working pressure is 2.5 bar, wherein said pressure pulse is more than 8 times the working pressure, and wherein said pressure pulses are generated every 5 minutes and are generated as follows:
  i) hermetically enclosing liquid nitrogen under working pressure in a storage region, wherein said storage region comprises a heat transfer means;
  ii) transferring heat via said heat transfer means, thereby evaporating part of said liquid nitrogen;
  iii) increasing the pressure of said storage region, by virtue of different volumes of gaseous nitrogen and liquid nitrogen; and
  iv) releasing in a pulsed manner liquid nitrogen or a mixture of liquid and gaseous nitrogen, when a desired set pressure value is reached.

* * * * *

UNITED STATES PATENT AND TRADEMARK OFFICE
CERTIFICATE OF CORRECTION

| | |
|---|---|
| PATENT NO. | : 7,263,842 B2 |
| APPLICATION NO. | : 10/491656 |
| DATED | : September 4, 2007 |
| INVENTOR(S) | : Kirsten Möller, Robert Taylor and Johannes Beuse |

Page 1 of 1

It is certified that error appears in the above-identified patent and that said Letters Patent is hereby corrected as shown below:

Claim 1, line 65, replace the words "process stoppage times" with --process and stoppage times--.
Claim 21, line 5, replace the number "80" with --8°--.
Claim 27, line 26, replace the words "between about 6° and about 10°" with --between 6° and 10°--.

Signed and Sealed this

Twenty-fifth Day of December, 2007

JON W. DUDAS
*Director of the United States Patent and Trademark Office*

UNITED STATES PATENT AND TRADEMARK OFFICE
CERTIFICATE OF CORRECTION

PATENT NO. : 7,263,842 B2  Page 1 of 1
APPLICATION NO. : 10/491656
DATED : September 4, 2007
INVENTOR(S) : Kirsten Möller, Robert Taylor and Johannes Beuse It is certified that error appears in the above-identified patent and that said Letters Patent is hereby corrected as shown below:

Column 5, Claim 1, line 65, replace the words "process stoppage times" with --process and stoppage times--.
Column 7, Claim 21, line 5, replace the number "80" with --8°--.
Column 7, Claim 27, line 26, replace the words "between about 6° and about 10°" with --between 6° and 10°--.

This certificate supersedes the Certificate of Correction issued December 25, 2007.

Signed and Sealed this

Twenty-ninth Day of January, 2008

JON W. DUDAS
*Director of the United States Patent and Trademark Office*